(12) United States Patent
Salemizadeh et al.

(10) Patent No.: US 10,366,283 B2
(45) Date of Patent: Jul. 30, 2019

(54) SYSTEMS AND METHODS OF READING AND PROCESSING CHANGE-OF-ADDRESS FORMS IN A CLOUD-BASED ARCHITECTURE

(71) Applicant: Siemens Industry, Inc., Alpharetta, GA (US)

(72) Inventors: Abdul Hamid Salemizadeh, Burleson, TX (US); Hongjian Li, Coppell, TX (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 115 days.

(21) Appl. No.: 15/414,146

(22) Filed: Jan. 24, 2017

(65) Prior Publication Data

US 2017/0270358 A1  Sep. 21, 2017

Related U.S. Application Data

(60) Provisional application No. 62/310,019, filed on Mar. 18, 2016.

(51) Int. Cl.
| | | |
|---|---|---|
| *B07C 3/00* | (2006.01) | |
| *G06K 9/00* | (2006.01) | |
| *G07B 17/00* | (2006.01) | |
| *H04L 29/08* | (2006.01) | |

(52) U.S. Cl.
CPC ............ *G06K 9/00442* (2013.01); *B07C 3/00* (2013.01); *H04L 67/12* (2013.01); *G07B 17/00435* (2013.01); *G07B 2017/00451* (2013.01)

(58) Field of Classification Search
None
See application file for complete search history.

(56) References Cited

U.S. PATENT DOCUMENTS

| | | |
|---|---|---|
| 7,145,093 B2 | 12/2006 | Mampe et al. |
| 7,769,778 B2 | 8/2010 | Snapp et al. |
| 7,792,683 B2 | 9/2010 | Sipe et al. |
| 8,195,575 B2 | 6/2012 | Krause et al. |
| 8,215,542 B2 | 7/2012 | Rochelle et al. |
| 2004/0032986 A1* | 2/2004 | Snapp ............... G06K 9/723 382/217 |
| 2004/0093222 A1 | 5/2004 | Sipe et al. |
| 2004/0120547 A1 | 6/2004 | Mampe et al. |
| 2007/0002388 A1* | 1/2007 | Henry ............. G06Q 10/107 358/400 |
| 2007/0098217 A1 | 5/2007 | Goyal et al. |
| 2009/0006394 A1 | 1/2009 | Snapp et al. |
| 2009/0157470 A1 | 6/2009 | Rathbun et al. |
| 2010/0102116 A1 | 4/2010 | Rochelle et al. |

(Continued)

*Primary Examiner* — Kevin Ky

(57) ABSTRACT

A method for processing change-of-address (COA) forms. The method includes capturing a first image of a first COA form. The method includes assigning a unique identifier to the first COA form and associating the unique identifier with the first image data. The method includes transmitting the first image data and the unique identifier to a cloud computing system. The cloud computing system performs an optical-character-recognition process on the first image data to produce name and address data including both an old address and a new address, validates the name and address data, and stores the name and address data in a change of address database.

16 Claims, 4 Drawing Sheets

(56) References Cited

U.S. PATENT DOCUMENTS

| | | | |
|---|---|---|---|
| 2010/0281529 A1 | 11/2010 | Krause et al. | |
| 2010/0324724 A1* | 12/2010 | Elmenhurst | B07C 3/14 |
| | | | 700/226 |
| 2011/0046775 A1* | 2/2011 | Bailey | B07C 3/00 |
| | | | 700/224 |
| 2013/0044350 A1 | 2/2013 | Goyal et al. | |

* cited by examiner

SYSTEMS AND METHODS OF READING AND PROCESSING CHANGE-OF-ADDRESS FORMS IN A CLOUD-BASED ARCHITECTURE

CROSS-REFERENCE TO RELATED APPLICATION

This application claims the benefit of the filing date of U.S. Provisional Patent Application 62/310,019, filed Mar. 18, 2016, which is hereby incorporated by reference.

TECHNICAL FIELD

Aspects of the present invention generally relate to reading and processing Change-of-Address (COA) forms in a cloud-based architecture.

BACKGROUND OF THE DISCLOSURE

The existing architecture and flow of COA forms processing require the processing system to be connected with the mail processing equipment at the processing center and another processing system located in a fixed location that directs the images to the COA forms readers and presents the unresolved images to the keyers. Each system has one set of readers physically connected to work with a set of video coding desks. Such a design has several limitations. For example, the readers are connected to one system only, and the processing power of the readers on one system is not available for use by another system. The results of the readers are only available for the video coding desks connected to the same system. The systems are difficult to maintain and costly to update, and require a highly trained and expensive labor force to maintain and operate. Improved systems are desirable.

SUMMARY OF THE DISCLOSURE

Disclosed embodiments relate to systems and method for processing COA forms. A method includes capturing a first image of a first COA form. The method includes assigning a unique identifier to the first COA form and associating the unique identifier with the first image data. The method includes transmitting the first image data and the unique identifier to a cloud computing system. The cloud computing system performs an optical-character-recognition process on the first image data to produce name and address data including both an old address and a new address, validates the name and address data, and stores the name and address data in a change of address database.

Another method for processing COA forms includes capturing, at a geographically regional processing center, a first image of a first COA form with a camera connected to an automated mail transport to create first image data. The method includes receiving the first image data in an image management system (IMS) at the geographically regional processing center. The method includes assigning a unique identifier to the first COA form by the IMS. The method includes associating the unique identifier with the first image data by the IMS. The method includes transmitting the first image data and the unique identifier to a cloud computing system. The cloud computing system performs an optical-character-recognition process on the first image data to produce name and address data, the name and address data including both an old address and a new address. The cloud computing system performs a validation process on the name and address data. The cloud computing system associates the name and address data with the unique identifier. The cloud computing system performs a lookup process according to the name and address data and saves the name and address data, including the new address and a validation result. The cloud computing system manages a system load of the cloud computing system and automatically distributes the images and data within the cloud computing system. The method includes, when the validation result indicates that the name and address data are validated, then storing the name and address data in a change of address database.

Another embodiment includes a cloud-based architecture for processing COA forms. The cloud-based architecture includes a geographically regional processing center including mail processing equipment, a cloud computing system including a plurality of data processing systems, connected to communicate with the geographically regional processing center via a network, and a change of address database. The mail processing equipment is configured to capture a first image of a first COA form with a camera connected to an automated mail transport to create first image data, receive the first image data, assign a unique identifier to the first COA form, associate the unique identifier with the first image data, and transmit the first image data and the unique identifier to a cloud computing system. The cloud computing system is configured to perform an optical-character-recognition process on the first image data to produce name and address data, the name and address data including both an old address and a new address, perform a validation process on the name and address data, associate the name and address data with the unique identifier, perform a lookup process according to the name and address data and saves the name and address data, including the new address and a validation result, and manage a system load of the cloud computing system and automatically distributes the images and data within the cloud computing system. When the validation result indicates that the name and address data are validated, then the name and address data is stored in a change of address database.

In some embodiments, the method also includes storing the unique identifier and the validation result. In some embodiments, the method also includes discarding the first image data from the cloud computing system. In some embodiments, when the validation result indicates that the name and address data are not validated by the cloud computing system, transmitting the unique identifier, the first COA image data, and any partial name and address data to be manually processed. In some embodiments, the first COA form is not imaged a second time before being manually processed. In some embodiments, the geographically regional processing center is a United States Postal Service Processing & Distribution Center. In some embodiments, the cloud computing system is connected to a plurality of geographically regional processing centers. In some embodiments, a plurality of validation processes for a plurality of geographically regional processing centers are performed by the cloud computing system.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

The figures discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Figure 1:
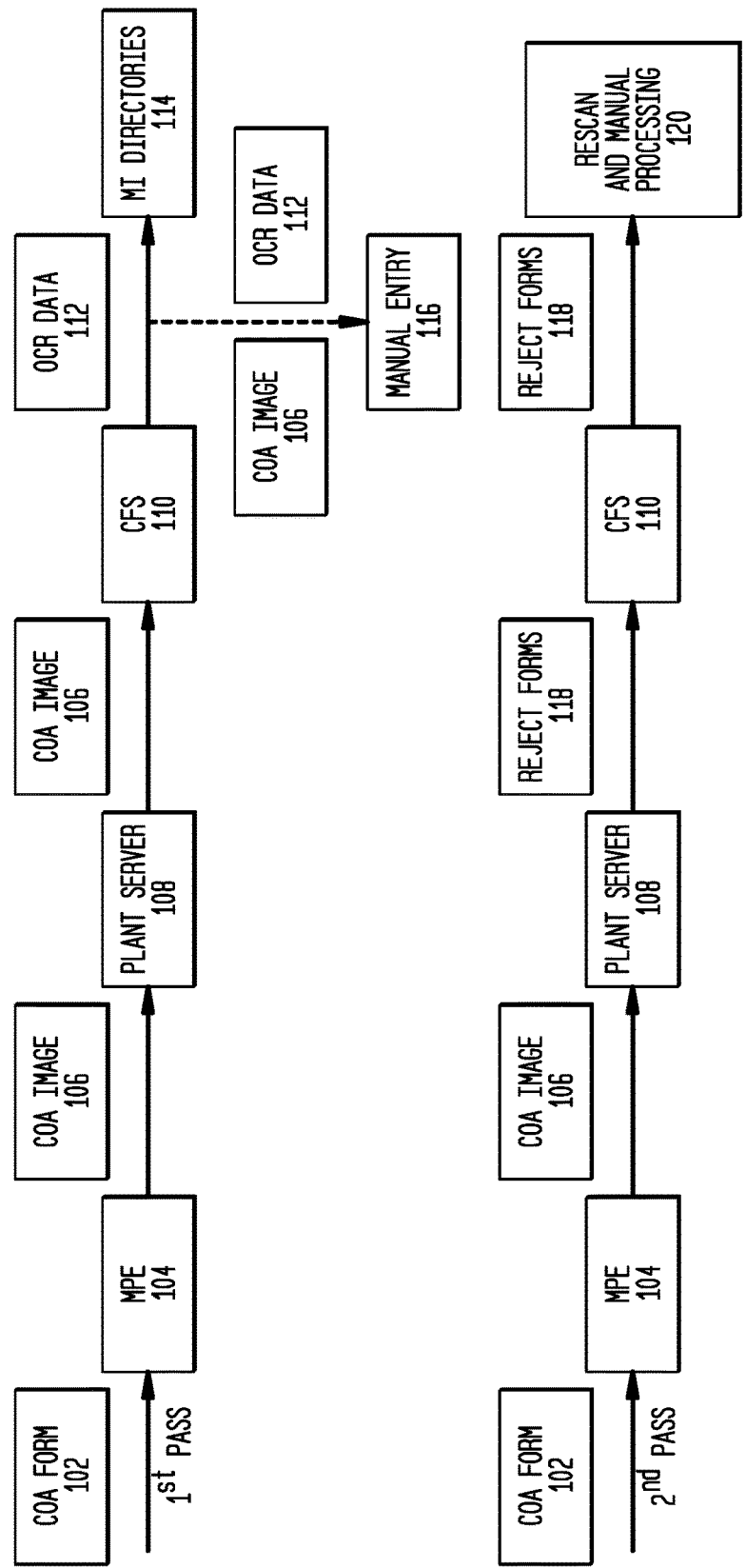
FIG. 1 illustrates an example of COA forms processing.

FIG. 1 illustrates an example of COA forms processing. In a process as illustrated in FIG. 1, COA forms 102 are scanned in a special run on letter mail processing equipment (MPE) 104 (first pass). The MPE 104 scans the COA form 102 and creates a digital image 106 of the form for subsequent automation software to determine the disposition and process the COA form information. The COA form digital images 106 are transmitted by the MPE 104 to a special plant server 108 at the plant. The plant server 108 queues up and transmits the scanned COA images to a remote system called the Computerized Forwarding System (CFS) 110 site, consisting of multiple servers for processing.

The CFS system 110 contains specialized Optical Character Recognition (OCR) subsystems, created specifically for locating, extracting and interpreting information entered in various fields of the COA form 102 read from COA image 106. The OCR data 112 processed by the OCR systems are then verified and entered into a national network of Move Information (MI) directories 114 for intercepting and forwarding Undeliverable as Addressed (UAA) mail.

In scenarios where the OCR subsystems at CFS 110 are unsuccessful or partially successful in extracting/interpreting the COA OCR data 112 with a high degree of confidence, the COA image 106 along with any partial OCR data 112 (pre-knowledge) from the OCR subsystems is presented to a trained operator/keyer at manual entry 116 to complete the COA form processing, by keying and/or correcting the OCR data 112. If the COA form information cannot be completely handled by the aforementioned process using only the scanned digital image of the form, the COA form is classified as a Reject.

The physical COA forms 102 are run for a second time (second pass) through the MPE 104 to obtain a second COA image 106, which is sent to plant server 108 for a the disposition result and to separate the finalized (completely processed) COA forms 102 from the reject forms 118. The reject forms 118 are packaged and physically shipped to the remote COA forms processing center (CFS 110) for final processing. At the CFS sites 110, specially trained operators scan the reject forms 118 using a specialized multi-page scanner. The scanned image and the physical form are then used to determine the final disposition of the form information, illustrated as rescan and manual processing 120.

Note that, in the process of FIG. 1, all of the COA forms 102 are scanned twice, in the first pass and second pass through MPE 104. The reject forms 118 are scanned a third time at rescan and manual processing 120.

Figure 2:
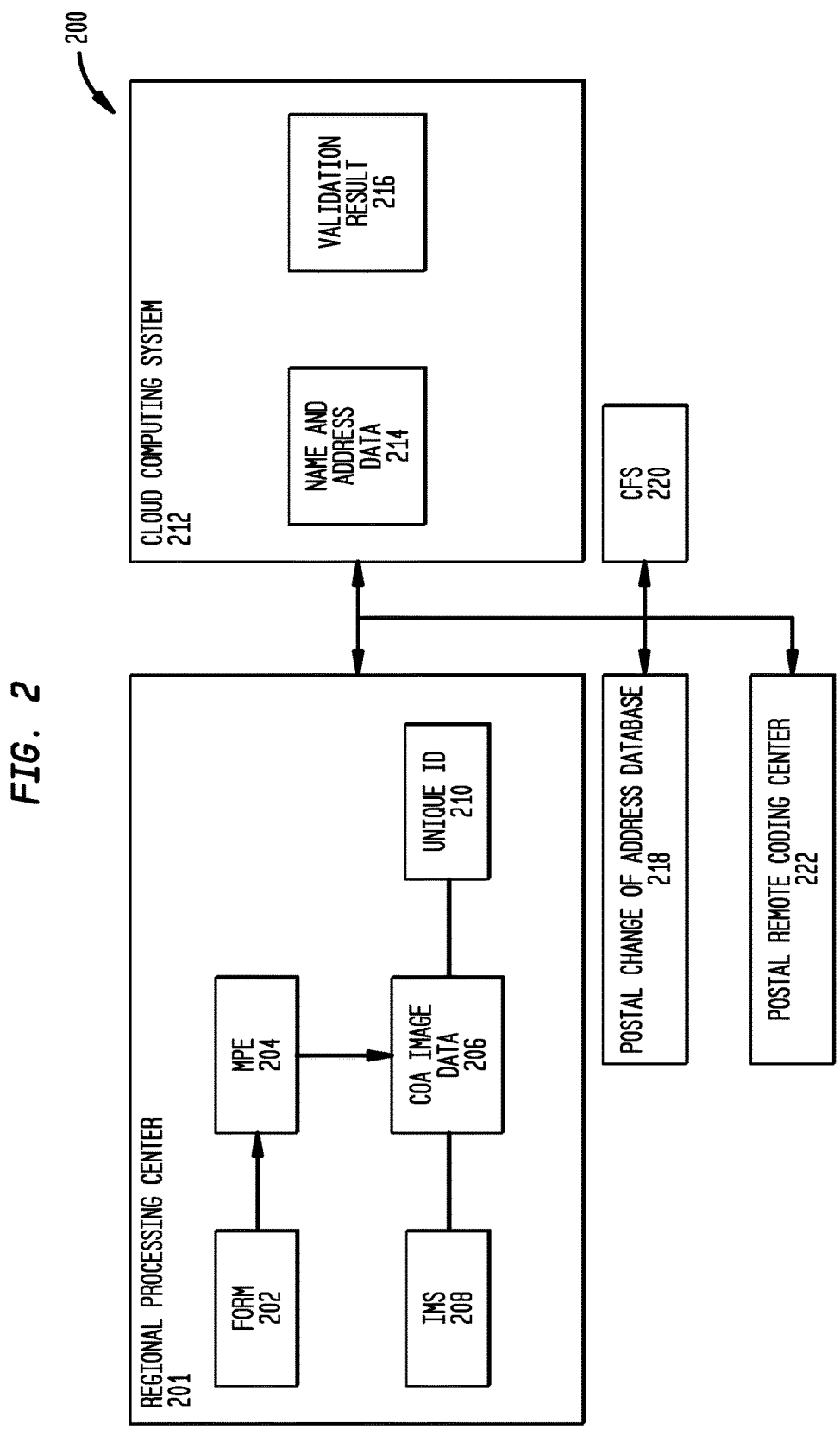
FIG. 2 illustrates a cloud-based architecture for a nationwide COA forms processing system in accordance with a disclosed embodiment.

FIG. 2 illustrates a cloud-based architecture for a nationwide COA forms processing system in accordance with one illustrative embodiment of the present invention. Various embodiments include a cloud-native architecture with operational stacks of containers that are comprised of a micro-architecture of workflow elements, middleware applications, and specialized OCR engines. While specific systems and centers are discussed below, the cloud based architecture overall is referred to below as a COA processing system 200, and operations performed by COA processing system 200 can be performed by any of the systems or elements described below with respect to FIG. 2. Further, operations specified to be performed by one element of COA processing system 200 below can alternatively be performed by other elements of COA processing system 200.

Figure 3:
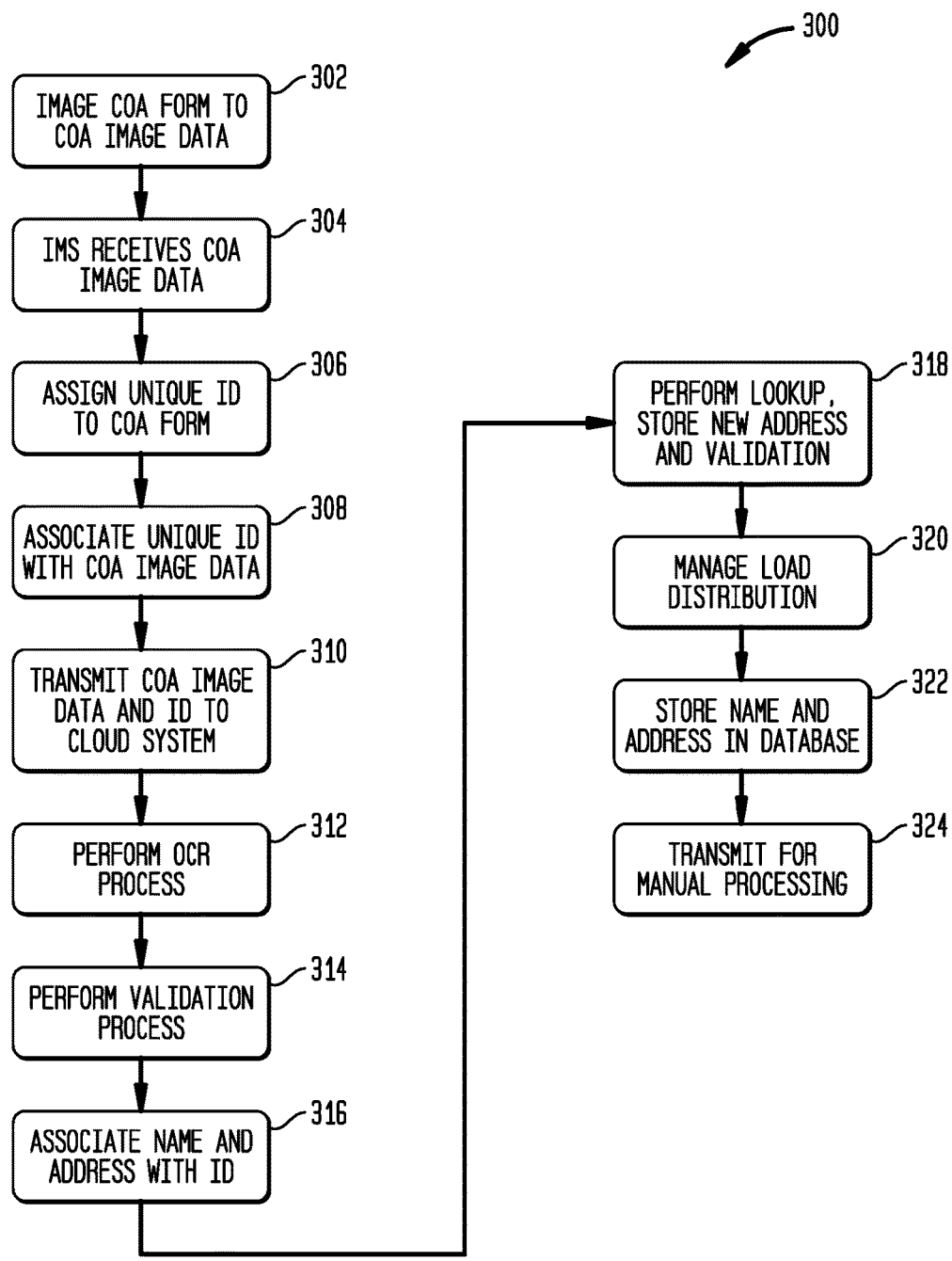
FIG. 3 illustrates a flowchart of a process in accordance with disclosed embodiments.

FIG. 3 illustrates a flowchart of a process in accordance with disclosed embodiments that can be performed in a cloud-based architecture as in FIG. 2. FIGS. 2 and 3 are therefore described in conjunction with each other. Note that while this process is described in terms of a single COA form, the process naturally will be performed for any number of forms that are received for processing.

According to disclosed embodiments, MPE 204, at a geographically regional processing center 201 of COA processing system 200, captures a first image of a first COA form 202 with a camera connected to an automated mail transport to create first COA image data 206 (operation 302). The geographically regional processing center can be, for example, a USPS Processing & Distribution Center (P&DC).

The first COA image data 206 is sent to and received by an Image Management System (IMS) 208 at the geographically regional processing center (operation 304). In some embodiments, the IMS 208 is part of the MPE 204.

The IMS 208 assigns a unique identifier 210 to the first COA form 202 (operation 306).

The IMS 208 associates the unique identifier 210 with the first COA image data 206 (operation 308).

The IMS 208 transmits the first COA image data 206 and the unique identifier 210 to a cloud computing system 212 (operation 310). The cloud computing system 212 is, in specific embodiments, connected to a plurality of geographically regional processing centers where images of COA forms are captured, such as USPS Processing & Distribution Centers (P&DC).

The cloud computing system 212 performs an optical-character-recognition process on the first COA image data 206 to produce name and address data 214 (operation 312).

The cloud computing system 212 performs a validation process on the name and address data 214 (operation 314). The name and address data 214 can include both an old address and a new address.

The cloud computing system 212 associates the name and address data 214 with the unique identifier (operation 316).

The cloud computing system 212 performs lookup process according to the name and address data 214 and saves the name and address data 214, including the new address and a validation result 216 (operation 318).

The cloud computing system 212 manages the system load and automatically distributes any images and data within the cloud computing system for optimal system performance (operation 320). In various embodiments, a plurality of validation processes for a plurality of geographically regional processing venters are performed by the cloud computing system.

When the validation result indicates that the name and address data are validated, the COA processing system 200 stores the name and address data in a Postal Change of Address Database (PAD) 218 (operation 322), and as part of this operation, can store the unique identifier 210 and the validation result 216. Also as part of this operation, the COA processing system 200 can transmit the first COA image data 206 and any other data to another system such as the Postal Automated Redirection System (PARS) subsystem National Customer Support Center (NCSC) IMS, and can discard the first image data from the cloud computing system 212.

When the validation result indicates that the name and address data are not validated by the cloud computing system 212 due to any elements of required name or address data, the COA processing system 200 transmits the unique identifier 210, the first COA image data 206, and any partial name and address data to be manually processed, such as by transmitting to a PARS Video Coding Desk (VCD) at a postal remote coding center 222 (operation 324). In manual processing, a human operator can view the first image and is prompted to enter the missing information to generate the complete name and address information if possible. In various embodiments, the first COA form is not imaged a second time (whether in a second-pass scan, a specialized scan, or otherwise) before being manually processed.

When the validation results indicate that the name and address data of the images are not validated by the human operator, the COA processing system 200 can retain the first COA image data 206 and any associated data elements. The actual first COA form 202 can be sent to a CFS 220 for further processing. The COA processing system at the CFS 220 has the capability of either scanning the image id or the full image to retrieve the processing data from the cloud. At this point the operator will use the physical forms along with the data retrieved from the cloud computing system to finalize the COA form. If the address and names of the changed addresses are resolved and validated the images and results are then transmitted to the NCSC IMS and removed from the COA processing system.

Figure 4:
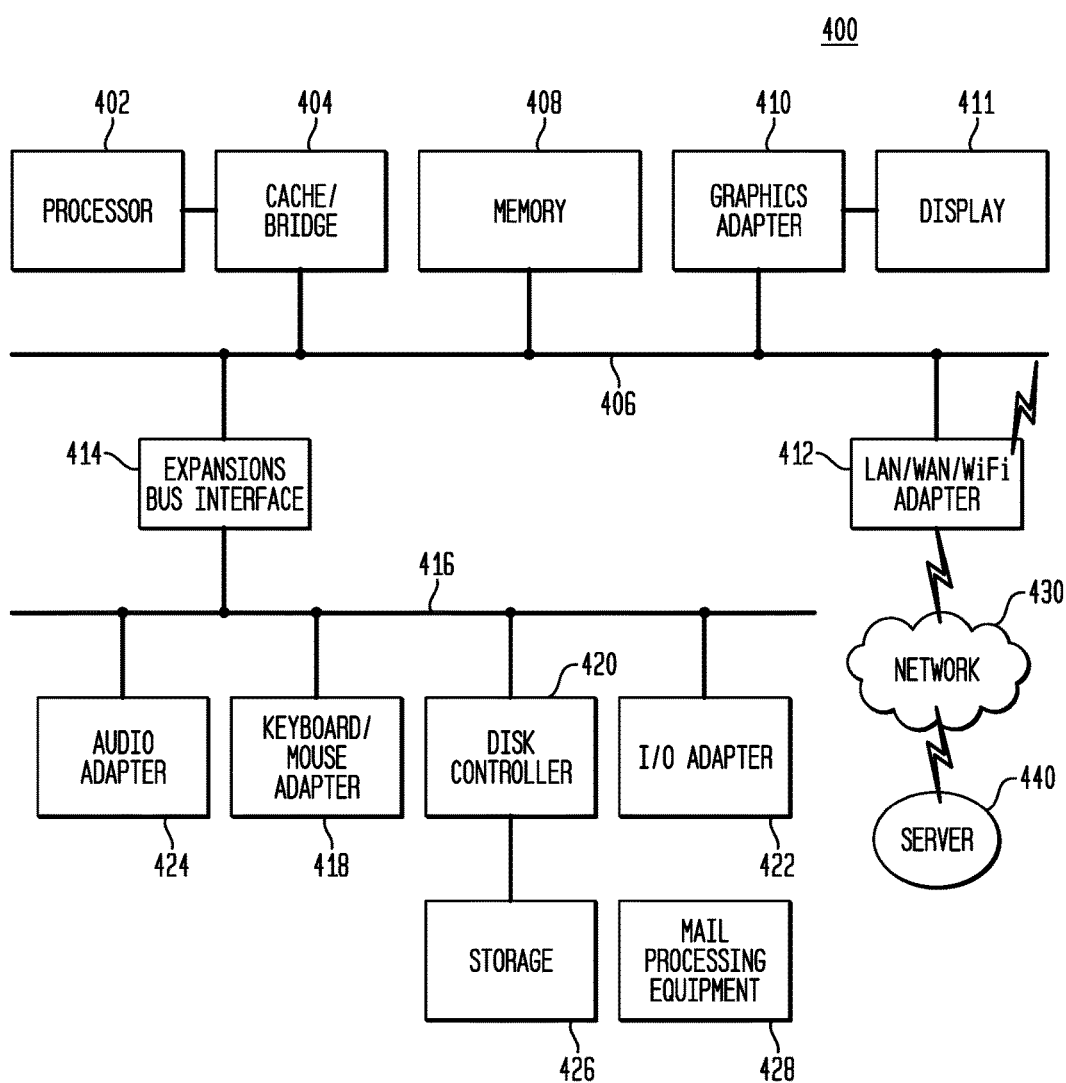
FIG. 4 depicts a block diagram of a data processing system in which an embodiment can be implemented.

FIG. 4 depicts a block diagram of a data processing system 400 in which an embodiment can be implemented, for example as a system for implementing MPE 204, plant server 108, DFS 110, MI directories 114, or one of the other systems described herein, and can be configured to perform processes as described herein. Data processing system can be used to implement one of multiple data processing systems in cloud computing system 212. The data processing system depicted includes a processor 402 connected to a level two cache/bridge 404, which is connected in turn to a local system bus 406. Local system bus 406 may be, for example, a peripheral component interconnect (PCI) architecture bus. Also connected to local system bus in the depicted example are a main memory 408 and a graphics adapter 410. The graphics adapter 410 may be connected to display 411.

Other peripherals, such as local area network (LAN)/Wide Area Network/Wireless (e.g. WiFi) adapter 412, may also be connected to local system bus 406. Expansion bus interface 414 connects local system bus 406 to input/output (I/O) bus 416. I/O bus 416 is connected to keyboard/mouse adapter 418, disk controller 420, and I/O adapter 422. Disk controller 420 can be connected to a storage 426, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

I/O adapter 422 can be connected to mail processing equipment 428, which can include COA transport or imaging devices, cameras, or other hardware devices for processing COA forms in accordance with the various embodiments described herein.

Also connected to I/O bus 416 in the example shown is audio adapter 424, to which speakers (not shown) may be connected for playing sounds. Keyboard/mouse adapter 418 provides a connection for a pointing device (not shown), such as a mouse, trackball, trackpointer, etc.

Those of ordinary skill in the art will appreciate that the hardware depicted in FIG. 4 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 412 can be connected to a network 430 (not a part of data processing system 400), which can be any public or private data processing system network or combination of networks, as known to those of skill in the art, including the Internet. LAN/WAN/Wireless adapter 412 can also communicate with packages as described herein, and perform other data processing system or server processes described herein. Data processing system 400 can communicate over network 430 with one or more server systems 440, which are also not part of data processing system 400, but can be implemented, for example, as separate data processing systems 400. A server system 440 can be, for example, any of the other systems described herein, and so indicates how systems can intercommunicate over network 430.

Operational "stacks" of COA images to be processed and operations to be performed can be implemented in an elastic fashion in the cloud computing system with controllers that monitor the load and automatically expand or contract the number of containers to react transparently and automatically to a nationwide ebb and flow of load for processing COA forms.

A cloud-native architecture in accordance with disclosed embodiment can also be implemented as a private cloud-native system to address data privacy requirements. The sensitive data processing equipment and transient storage can be hidden, for example, behind a series of strong firewalls at a United States Postal Service (USPS) data center. The non-data sensitive elastic load controllers can be implemented using industry standard cloud APIs in order to be compatible with and capable of utilizing any of the major cloud service providers such as those offered by Microsoft, Google, Amazon, etc.

A cloud-native architecture for COA processing as disclosed herein is much easier to maintain and operate than current systems, has high availability, is always up to date with the latest software, is maintained in a data center, does not require specialized IT knowledge in all facilities around the nation as in current systems, and is able to react to load/volume changes automatically. Furthermore, the cloud-based architecture provides an aggregate analysis capability, which supports the use of analytics to look for patterns of problems or potential problems and opportunities for enhancements.

It is important to note that while the disclosure includes a description in the context of a fully functional system, those skilled in the art will appreciate that at least portions of the mechanism of the present disclosure are capable of being distributed in the form of a computer-executable instructions contained within a machine-usable, computer-usable, or computer-readable medium in any of a variety of forms to cause a system to perform processes as disclosed herein, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs). In particular, computer readable mediums can include transitory and non-transitory mediums, unless otherwise limited in the claims appended hereto. For example, various embodiments include systems, methods, and computer-readable media.

Although an exemplary embodiment of the present disclosure has been described in detail, those skilled in the art will understand that various changes, substitutions, variations, and improvements disclosed herein may be made without departing from the spirit and scope of the disclosure in its broadest form. In the processes described above, various steps may be performed sequentially, concurrently, in a different order, or omitted, unless specifically described otherwise. Similarly, various elements of the systems and apparatuses described herein can be duplicated, rearranged, or omitted in various embodiments, unless described or claimed otherwise.

None of the description in the present application should be read as implying that any particular element, step, or function is an essential element which must be included in the claim scope: the scope of patented subject matter is defined only by the allowed claims. Moreover, none of these claims are intended to invoke 35 USC § 112(f) unless the exact words "means for" are followed by a participle.

What is claimed is:

1. A method for processing change-of-address (COA) forms, comprising:
   capturing, at a geographically regional processing center, a first image of a first COA form with a camera connected to an automated mail transport to create first image data;
   receiving the first image data in an image management system (IMS) at the geographically regional processing center;
   assigning a unique identifier to the first COA form by the IMS;
   associating the unique identifier with the first image data by the IMS;
   transmitting the first image data and the unique identifier to a cloud computing system, wherein the cloud computing system:
      performs an optical-character-recognition process on the first image data to produce name and address data, the name and address data including both an old address and a new address,
      performs a validation process on the name and address data,
      associates the name and address data with the unique identifier,
      performs a lookup process according to the name and address data and saves the name and address data, including the new address and a validation result, and
      manages a system load of the cloud computing system and automatically distributes the images and data within the cloud computing system,
   wherein when the validation result indicates that the name and address data are validated, then storing the name and address data in a change of address database.

2. The method according to claim 1, further comprising storing the unique identifier and the validation result.

3. The method according to claim 1, further comprising discarding the first image data from the cloud computing system.

4. The method according to claim 1, wherein when the validation result indicates that the name and address data are not validated by the cloud computing system, transmitting the unique identifier, the first COA image data, and any partial name and address data to be manually processed.

5. The method according to claim 4, wherein the first COA form is not imaged a second time before being manually processed.

6. The method according to claim 1, wherein the geographically regional processing center is a United States Postal Service Processing & Distribution Center.

7. The method according to claim 1, wherein the cloud computing system is connected to a plurality of geographically regional processing centers.

8. The method according to claim 1, wherein a plurality of validation processes for a plurality of geographically regional processing centers are performed by the cloud computing system.

9. A cloud-based architecture for processing change-of-address (COA) forms, comprising:
- a geographically regional processing center including mail processing equipment;
- a cloud computing system including a plurality of data processing systems, connected to communicate with the geographically regional processing center via a network; and
- a change of address database, wherein the mail processing equipment is configured to:
  - capture a first image of a first COA form with a camera connected to an automated mail transport to create first image data;
  - receive the first image data;
  - assign a unique identifier to the first COA form;
  - associate the unique identifier with the first image data; and
  - transmit the first image data and the unique identifier to a cloud computing system,
- wherein the cloud computing system is configured to:
  - perform an optical-character-recognition process on the first image data to produce name and address data, the name and address data including both an old address and a new address,
  - perform a validation process on the name and address data,
  - associate the name and address data with the unique identifier,
  - perform a lookup process according to the name and address data and saves the name and address data, including the new address and a validation result, and
  - manage a system load of the cloud computing system and automatically distribute the images and data within the cloud computing system,
- wherein when the validation result indicates that the name and address data are validated, then the name and address data is stored in the change of address database.

10. The cloud-based architecture for processing COA forms according to claim 9, wherein the unique identifier and the validation result are stored in an image management system (IMS).

11. The cloud-based architecture for processing COA forms according to claim 9, wherein the cloud computing system discards the first image data.

12. The cloud-based architecture for processing COA forms according to claim 9, wherein when the validation result indicates that the name and address data are not validated by the cloud computing system, transmitting the unique identifier, the first COA image data, and any partial name and address data to be manually processed.

13. The cloud-based architecture for processing COA forms according to claim 12, wherein the first COA form is not imaged a second time before being manually processed.

14. The cloud-based architecture for processing COA forms according to claim 9, wherein the geographically regional processing center is a United States Postal Service Processing & Distribution Center.

15. The cloud-based architecture for processing COA forms according to claim 9, wherein the cloud computing system is connected to a plurality of geographically regional processing centers.

16. The cloud-based architecture for processing COA forms according to claim 9, wherein a plurality of validation processes for a plurality of geographically regional processing centers are performed by the cloud computing system.

* * * * *